US010168745B2

(12) United States Patent
Abe et al.

(10) Patent No.: US 10,168,745 B2
(45) Date of Patent: Jan. 1, 2019

(54) INFORMATION PROCESSING APPARATUS INCLUDING POWER SUPPLY CABLE COUPLED TO CIRCUIT BOARD AND COUPLING CABLE COUPLED TO DISPLAY AND NOTEBOOK TYPE PERSONAL COMPUTER INCLUDING INFORMATION PROCESSING APPARATUS

(71) Applicant: FUJITSU LIMITED, Kawasaki-shi, Kanagawa (JP)

(72) Inventors: Takashi Abe, Kawasaki (JP); Takashi Iijima, Kawasaki (JP); Shinya Matsushita, Yokohama (JP)

( * ) Notice: Subject to any disclaimer, the term of this patent is extended or adjusted under 35 U.S.C. 154(b) by 3 days.

(21) Appl. No.: 15/187,312

(22) Filed: Jun. 20, 2016

(65) Prior Publication Data

US 2017/0052567 A1   Feb. 23, 2017

(30) Foreign Application Priority Data

Aug. 18, 2015   (JP) .................................. 2015-160978

(51) Int. Cl.
*G06F 1/16*   (2006.01)
(52) U.S. Cl.
CPC .......... *G06F 1/1656* (2013.01); *G06F 1/1616* (2013.01); *G06F 1/1635* (2013.01)
(58) Field of Classification Search
CPC .... G06F 1/1656; G06F 1/1683; G06F 1/1616; G06F 1/1635; H05K 2201/10356; H05K 1/0219
See application file for complete search history.

(56) References Cited

U.S. PATENT DOCUMENTS

| 2006/0022774 A1* | 2/2006 | Greeley | .................. H01P 1/047 |
| | | | 333/246 |
| 2009/0321235 A1* | 12/2009 | Iijima | ..................... G06F 1/162 |
| | | | 200/329 |
| 2011/0228496 A1* | 9/2011 | Huang | .................... G06F 1/183 |
| | | | 361/752 |

FOREIGN PATENT DOCUMENTS

| JP | 62-135216 | | 6/1987 |
| JP | 2000-267759 | A | 9/2000 |
| JP | 2002-237224 | A | 8/2002 |
| JP | 2009-44503 | | 2/2009 |
| JP | 2009044503 | A * | 2/2009 |
| JP | 2012-141935 | | 7/2012 |

OTHER PUBLICATIONS

Notice of Allowance for Patent Application No. JP2015-160978 dated Oct. 30, 2018 (3 pages) and translation (3 pages).

* cited by examiner

*Primary Examiner* — James Wu
(74) *Attorney, Agent, or Firm* — Harness, Dickey & Pierce, P.L.C.

(57) ABSTRACT

An information processing apparatus includes: a display unit; a circuit board; a power supply cable coupled to the circuit board; a coupling cable including an overlapping portion that overlaps with the power supply cable as viewed in a thicknesswise direction of the circuit board and coupled to the display unit; and a projection projecting from the circuit board and disposed between the power supply cable and the overlapping portion.

14 Claims, 5 Drawing Sheets

INFORMATION PROCESSING APPARATUS INCLUDING POWER SUPPLY CABLE COUPLED TO CIRCUIT BOARD AND COUPLING CABLE COUPLED TO DISPLAY AND NOTEBOOK TYPE PERSONAL COMPUTER INCLUDING INFORMATION PROCESSING APPARATUS

CROSS-REFERENCE TO RELATED APPLICATION

This application is based upon and claims the benefit of priority of the prior Japanese Patent Application No. 2015-160978, filed on Aug. 18, 2015, the entire contents of which are incorporated herein by reference.

FIELD

The embodiment disclosed herein is related to an information processing apparatus and a notebook type personal computer.

BACKGROUND

An information processing apparatus includes a notebook type personal computer that includes, for example, a main unit including a circuit board and a display apparatus including a display unit.

Related arts are disclosed in Japanese Laid-open Patent Publication No. 2012-141935, Japanese Laid-open Patent Publication No. 62-135216 or Japanese Laid-open Patent Publication No. 2009-44503.

SUMMARY

According to an aspect of the embodiment, an information processing apparatus includes: a display unit; a circuit board; a power supply cable coupled to the circuit board; a coupling cable including an overlapping portion that overlaps with the power supply cable as viewed in a thicknesswise direction of the circuit board and coupled to the display unit; and a projection projecting from the circuit board and disposed between the power supply cable and the overlapping portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, a display apparatus of a notebook type personal computer is fixed for pivotal motion to a main unit. For example, a power supply cable is coupled to a circuit board, and a display unit and the circuit board are coupled to each other by a coupling cable.

If the power supply cable contacts with the coupling cable, power supply noise of the power supply cable is transmitted to the coupling cable, and a display defect arising from the power supply noise may occur with the display unit.

Figure 1:
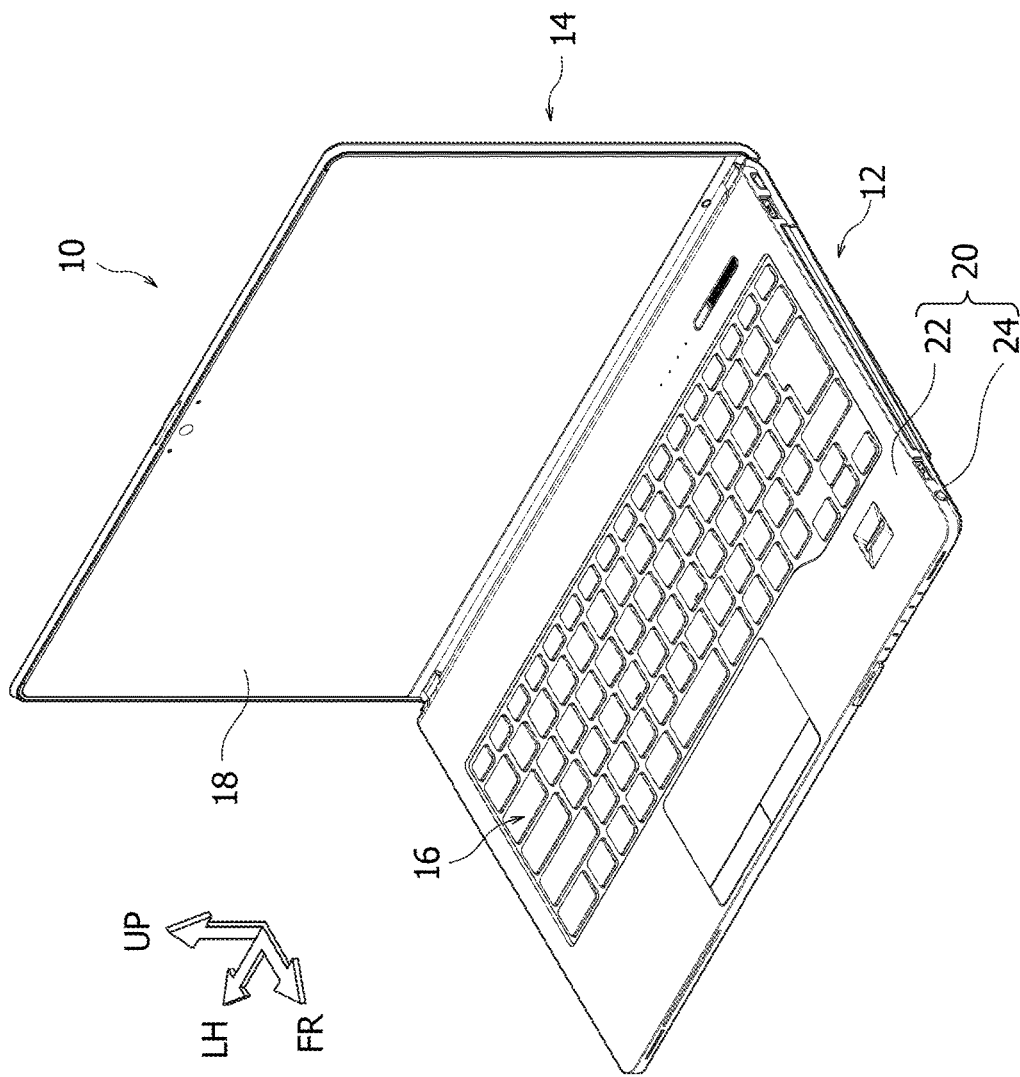
FIG. 1 depicts an example of a perspective view of a notebook type personal computer.

As an example of the information processing apparatus, a notebook type personal computer is described. FIG. 1 depicts an example of a perspective view of a notebook type personal computer.

In the figures, arrow marks UP, FR, and LH denote the upper side in the heightwise direction, this side (front side) in the depthwise direction, and the left side in the widthwise direction, respectively, of a notebook type personal computer 10. As depicted in FIG. 1, the notebook type personal computer 10 includes a main unit 12 and a display apparatus 14.

A keyboard unit 16 is provided on the main unit 12, and the display apparatus 14 includes a display unit 18 such as, for example, a liquid crystal display unit. The display apparatus 14 is fixed for pivotal motion to the main unit 12. The display apparatus 14 can assume a state in which it is closed to the side of the main unit 12 and another state in which it is opened from the main unit 12. In FIG. 1, the display apparatus 14 is depicted in an opened state.

Figure 2:
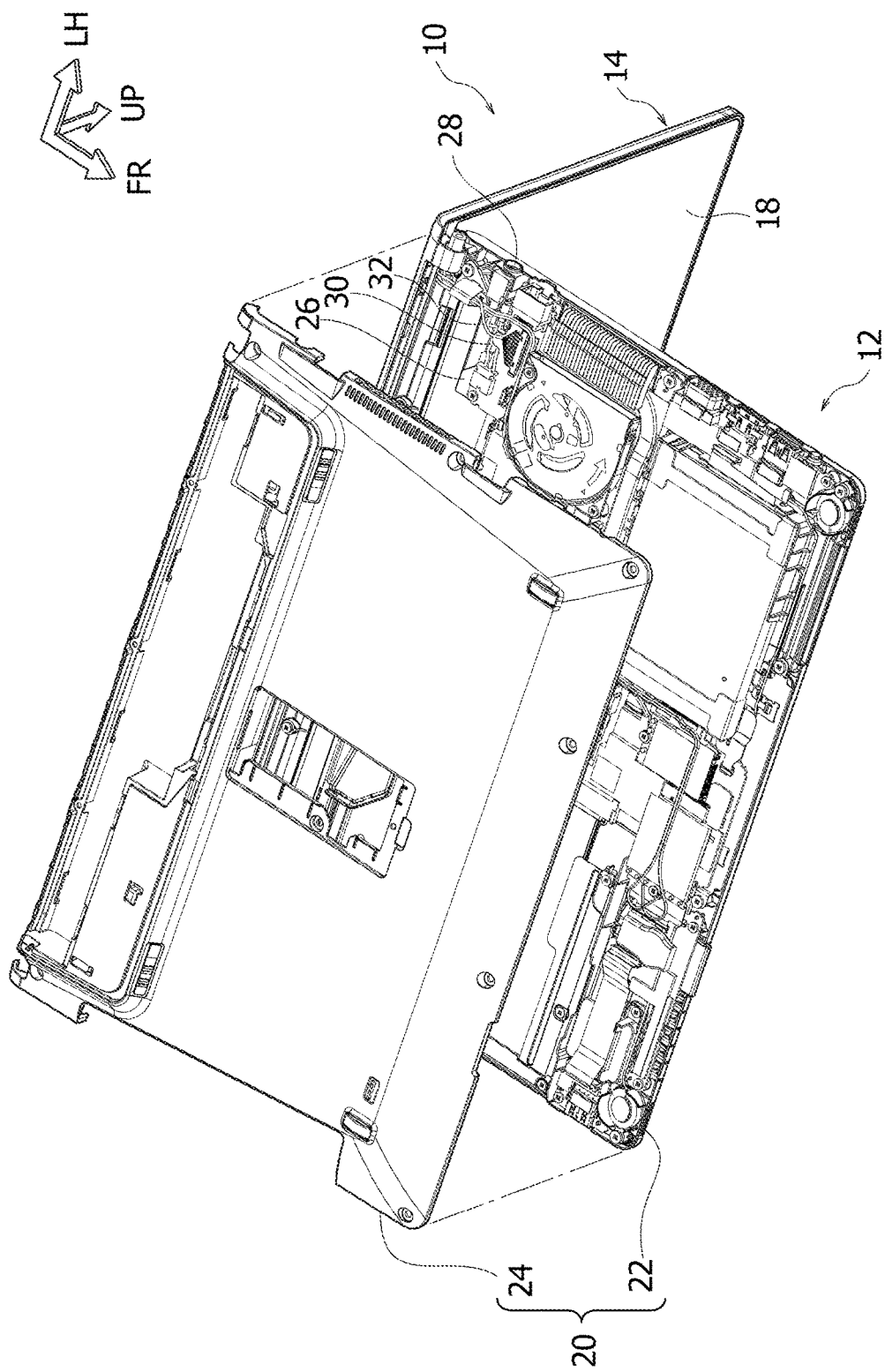
FIG. 2 depicts an example of a perspective view of a notebook type personal computer as viewed from a bottom face side.

The main unit 12 includes a case 20 of a shape of a flattened box. The case 20 includes an upper cover 22 and a lower cover 24 as two divisional parts in the thicknesswise direction of the main unit 12. FIG. 2 depicts an example of a perspective view of a notebook type personal computer as viewed from a bottom face side. The notebook type personal computer illustrated in FIG. 2 may be the notebook type personal computer 10 illustrated in FIG. 1. In FIG. 2, a state in which the lower cover 24 is removed from the upper cover 22 is illustrated.

As depicted in FIG. 2, the main unit 12 includes a circuit board 26 (main board) at the inner side of the case 20. The circuit board 26 is disposed such that the thicknesswise direction thereof is the thicknesswise direction of the main unit 12. A plurality of electronic parts for performing driving and so forth of the display unit 18 described hereinabove are mounted on the circuit board 26. Various connectors including an external power supply connector 28 and so forth are disposed on a side portion of the main unit 12.

Figure 3:
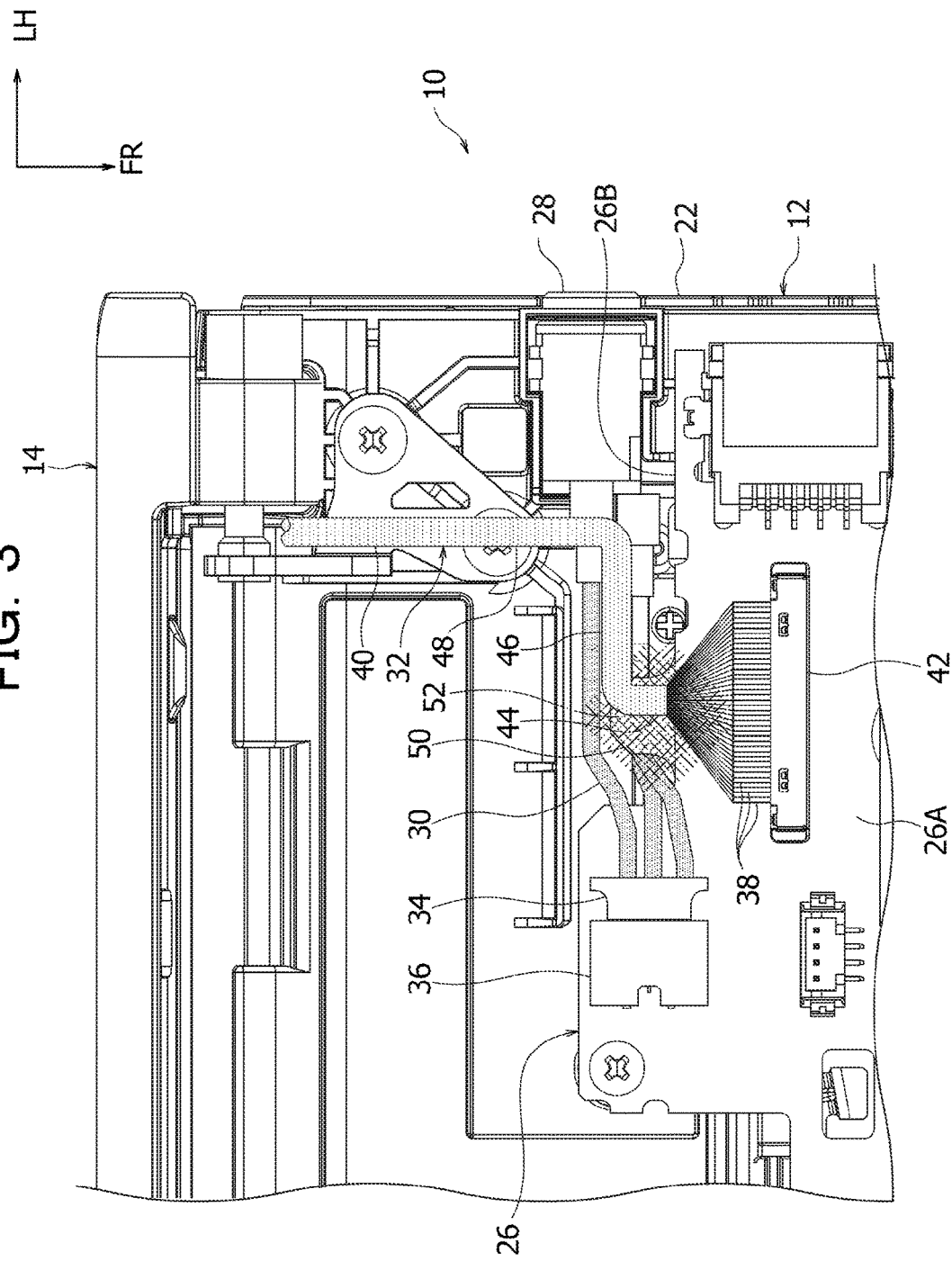
FIG. 3 depicts an example of a partial enlarged bottom plan view of a main unit.
Figure 4:
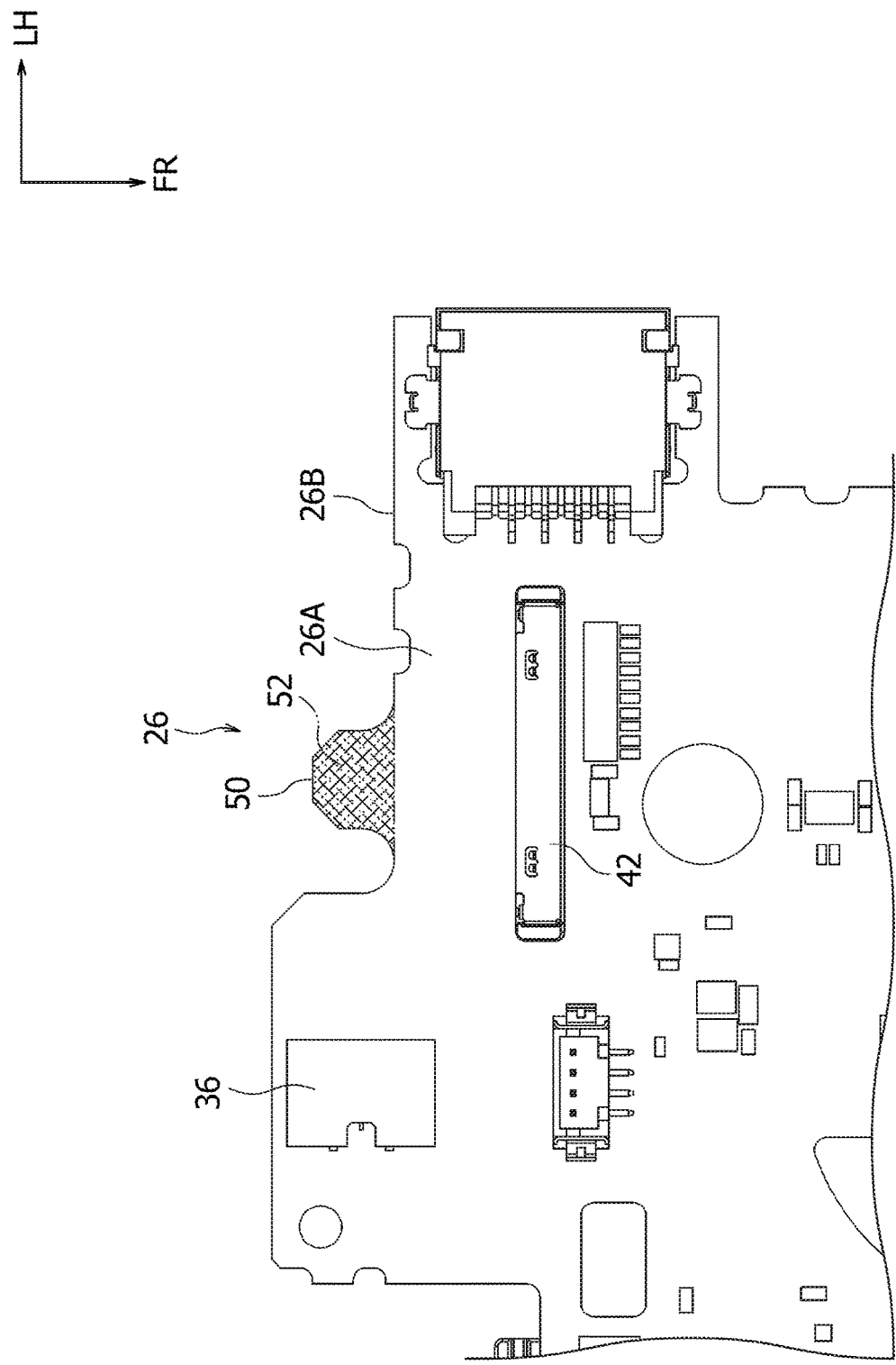
FIG. 4 depicts an example of a partial enlarged bottom plan view of a peripheral portion of a projection.

FIG. 3 depicts an example of a partial enlarged bottom plan view of a main unit. The main unit illustrated in FIG. 3 may be the main unit 12 illustrated in FIG. 1. FIG. 4 depicts an example of a partial enlarged bottom plan view of a peripheral portion of a projection. In FIG. 3, the main unit 12 is depicted in a state in which the lower cover 24 described hereinabove (refer to FIG. 2) is removed. As depicted in FIG. 3, a power supply cable 30 and a coupling cable 32 are provided in the inside of the main unit 12.

The power supply cable 30 is coupled at one end thereof to the external power supply connector 28, and a connector 34 is coupled to the other end of the power supply cable 30. A power supply connector 36 is mounted on a lower face 26A of the circuit board 26, and the connector 34 is coupled to the power supply connector 36. The power supply cable 30 that couples the power supply connector 36 and the external power supply connector 28 to each other is laid along an edge portion 26B positioned at the rear side of the main unit 12 from among a plurality of edge portions formed on the circuit board 26 of a substantially rectangular shape.

The coupling cable 32 includes a plurality of coupling lines 38. The plurality of coupling lines 38 are bundled by a cladding 40. A coupling connector 42 is mounted on the lower face 26A of the circuit board 26, and the coupling cable 32 is coupled at one end thereof (at one end of the coupling lines 38) to the coupling connector 42. Further, the coupling cable 32 is coupled at the other end thereof to the display unit 18 described hereinabove (refer to FIGS. 1 and 2). To the display unit 18, power is supplied from the circuit board 26 via the coupling cable 32 and a signal is sent from the circuit board 26.

A portion of the coupling cable 32 between the one end and the other end (portion bundled by the cladding 40) is wired bypassing parts and structures in the inside of the main unit 12. The portion of the coupling cable 32 between the one end and the other end includes a plurality of wire portions 44, 46, and 48 continuing with respective bent portions left therebetween.

The wire portion 44 extends from the circuit board 26 to the rear side of the main unit 12, and the wire portion 46 extends from the wire portion 44 to the outer side (left side) in the widthwise direction of the main unit 12. Further, the wire portion 48 extends from the wire portion 46 to the rear side of the main unit 12.

Part of the coupling cable 32, for example, the wire portions 44 and 46, overlap with part of the power supply cable 30 as viewed in the thicknesswise direction of the circuit board 26. The wire portions 44 and 46 are positioned at the bottom face side of the main unit 12 with respect to the power supply cable 30. The wire portion 44 from between the wire portions 44 and 46 may correspond to one example of the "overlapping portion."

A projection 50 in the form of a tongue is formed at one edge portion 26B of the circuit board 26 such that it projects toward the rear side of the main unit 12 (refer to FIG. 4). The projection 50 is disposed between the power supply cable 30 and the coupling cable 32 (wire portion 44). In a state in which the main unit 12 is disposed horizontally when the notebook type personal computer 10 is used normally, the circuit board 26 is disposed such that the vertical direction is the thicknesswise direction thereof, and the projection 50 projects in a horizontal direction from the circuit board 26. Each of the tip corner parts of the projection 50 is chamfered.

A ground portion 52 is provided on the projection 50 (refer to FIG. 4). The ground portion 52 is formed from a metal such as, for example, copper and is grounded similarly to other ground portions formed on the circuit board 26.

Upon assembly of the main unit 12, the main unit 12 is placed upside down. The power supply cable 30 is wired such that it passes through the lower side of the projection 50, and the coupling cable 32 is wired such that it passes the upper side of the circuit board 26. At this time, the coupling cable 32 is left in a free state in which it is not pasted or fixed to the lower face 26A of the circuit board 26. The internal parts of the main unit 12 are assembled in accordance with a buildup approach in a state in which it is placed upside down.

Figure 5:
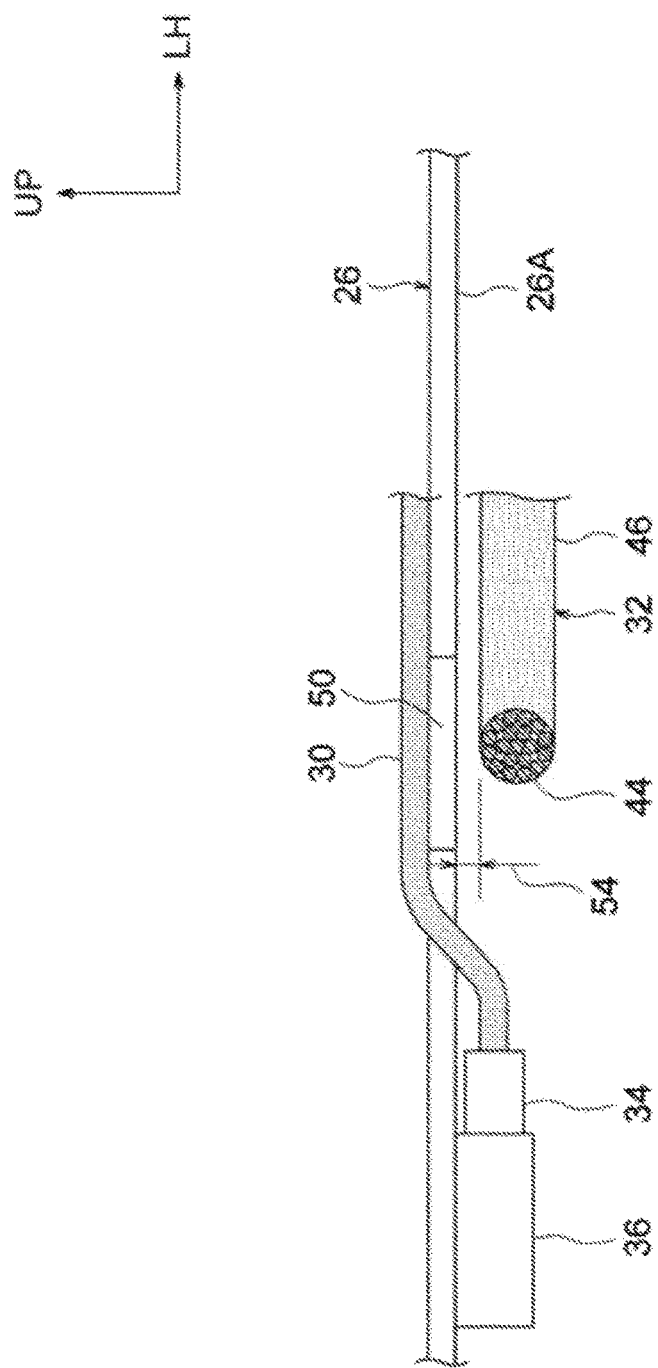
FIG. 5 depicts an example of a partial enlarged vertical sectional view of a peripheral portion of a projection.

FIG. 5 depicts an example of a partial enlarged vertical sectional view of a peripheral portion of a projection. The projection illustrated in FIG. 5 may be the projection 50 illustrated in FIG. 3. In FIG. 5, a peripheral portion of the projection 50 is depicted in rear elevation. In FIG. 5, the main unit 12 is disposed horizontally in an original upward and downward orientation. As depicted in FIG. 5, where the main unit 12 is placed horizontally in an original upward and downward orientation, the power supply cable 30 passes the upper side in the vertical direction with respect to the projection 50, and the wire portion 44 is disposed on the lower side in the vertical direction with respect to the projection 50. The power supply cable 30 is supported by its own weight on the projection 50, and the wire portion 44 is spaced by its own weight to the lower side in the vertical direction with respect to the projection 50. A clearance 54 is formed between the wire portion 44 and the projection 50.

The coupling cable 32 includes the wire portion 44 that overlaps with the power supply cable 30 as viewed in the thicknesswise direction of the circuit board 26, and the projection 50 projecting from the circuit board 26 is disposed between the power supply cable 30 and the wire portion 44. Accordingly, since contact between the power supply cable 30 and the coupling cable 32 is suppressed by the projection 50, transmission of power supply noise of the power supply cable 30 to the coupling cable 32 may be reduced. Therefore, appearance of a display defect originating from power supply noise of the power supply cable 30 may be reduced in the display unit 18.

The projection 50 disposed between the power supply cable 30 and the coupling cable 32 (wire portion 44) is formed integrally with the circuit board 26 so as to project from the circuit board 26. Accordingly, a member for exclusive use for suppressing contact between the power supply cable 30 and the coupling cable 32 may not be required, and therefore, increase of the number of parts and the number of assembling steps may be reduced. Consequently, reduction in cost may be anticipated and the assembling property of the main unit 12 may be improved.

The ground portion 52 is provided on the projection 50. Since the ground portion 52 functions as a metal shield, power supply noise may be cut off. Therefore, transmission of power supply noise of the power supply cable 30 to the coupling cable 32 may be reduced effectively.

Where the main unit 12 is placed horizontally in an original upward and downward orientation, the power supply cable 30 passes the upper side in the vertical direction with respect to the projection 50 and the wire portion 44 of the coupling cable 32 is disposed on the lower side in the vertical direction with respect to the projection 50. The power supply cable 30 is supported by its own weight on the projection 50, and the wire portion 44 is spaced by its own weight to the lower side in the vertical direction with respect to the projection 50. Therefore, since the power supply cable 30 and the wire portion 44 are appropriately spaced from each other, transmission of power supply noise of the power supply cable 30 to the coupling cable 32 may be reduced effectively.

Since the wire portion 44 is spaced by its own weight to the lower side in the vertical direction with respect to the projection 50, the clearance 54 is formed between the wire portion 44 and the projection 50. Therefore, a spacing distance is assured between the power supply cable 30 and the wire portion 44, and transmission of power supply noise of the power supply cable 30 to the coupling cable 32 may be reduced.

The power supply connector 36 and the coupling connector 42 are mounted on the lower face 26A of the circuit board 26, and the power supply cable 30 passes the upper side in the vertical direction with respect to the projection 50 and the wire portion 44 is disposed on the lower side in the vertical direction with respect to the projection 50. Therefore, in a state in which the main unit 12 is placed upside down, internal parts of the main unit 12 are assembled in a buildup approach. The assembly property of the main unit 12 may be improved further.

Although the projection 50 is disposed between the power supply cable 30 and the wire portion 44, the projection 50 may be disposed otherwise between the power supply cable 30 and the wire portions 44 and 46. In this case, the wire portions 44 and 46 may correspond to an example of the "overlapping portion."

The power supply connector 36 and the coupling connector 42 are mounted on the lower face 26A of the circuit board 26. The power supply cable 30 passes the upper side in the vertical direction with respect to the projection 50 and the wire portion 44 is disposed on the lower side in the vertical direction with respect to the projection 50.

The power supply connector 36 and the coupling connector 42 may be mounted on the upper face of the circuit board 26, and the power supply cable 30 may pass the lower side in the vertical direction with respect to the projection 50 and the wire portion 44 may be disposed on the upper side in the vertical direction with respect to the projection 50. In this case, the wire portion 44 may be supported by its own weight on the projection 50, and the power supply cable 30 may be spaced by its own weight to the lower side in the vertical direction with respect to the projection 50.

Although the coupling cable 32 couples the display unit 18 and the circuit board 26 to each other, it may couple, in addition to the circuit board 26, a board provided on the main unit 12 and the display unit 18 to each other.

The structure including the projection 50 described above is applied to a notebook type personal computer. However, the structure including the projection 50 described above may be applied to an information processing apparatus other than a notebook type personal computer.

The embodiment described above may be combined suitably.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a display;
a circuit board including a first surface and a second surface opposite to the first surface;
a power supply cable coupled to a power supply connector mounted on the first surface and extending to a side of the second surface via a notch provided in a sidewall of the circuit board;
a coupling cable coupled to the display and including an overlapping portion that overlaps with the power supply cable which extends to the side of the second surface from the side of the first surface via the notch as viewed in a thicknesswise direction of the circuit board and is provided on the side of the first surface; and
a projection disposed between the power supply cable and the overlapping portion and projecting from the sidewall of the circuit board in such a manner that the projection forms a first inner surface of the notch and the power supply cable extends from the power supply connector provided on a side of a second inner surface of the notch opposite to the first inner surface to the second surface on a side of the first inner surface via the notch and extends beyond the projection along the sidewall of the circuit board,
wherein the power supply cable, after going through the notch, extends over the overlapping portion while being in contact with a surface of the projection on the side of the second surface, continues to extend over the second surface without returning to the side of the first surface and is coupled to an external power supply connector on the side of the second surface.

2. The information processing apparatus according to claim 1, wherein a ground portion is provided on the projection.

3. The information processing apparatus according to claim 1, wherein the circuit board is disposed such that the thicknesswise direction of the circuit board is a vertical direction; and
the projection projects in a horizontal direction from the circuit board.

4. The information processing apparatus according to claim 3, wherein the power supply cable passes an upper side in the vertical direction with respect to the projection; and the overlapping portion is disposed on a lower side in the vertical direction with respect to the projection.

5. The information processing apparatus according to claim 4, wherein the power supply cable is supported by own weight of the power supply cable on the projection.

6. The information processing apparatus according to claim 4, wherein the overlapping portion is spaced by own weight of the overlapping portion to the lower side in the vertical direction with respect to the projection.

7. The information processing apparatus according to claim 1, wherein a coupling connector are mounted on the first surface of the circuit board; and the coupling cable is coupled to the coupling connector.

8. A notebook type personal computer comprising:
a main apparatus including a circuit board including a first surface and a second surface opposite to the first surface;
a display apparatus including a display and fixed for pivotal motion to the main apparatus;
a power supply cable coupled to a power supply connector mounted on the first surface and extending to a side of the second surface via a notch provided in a sidewall of the circuit board;
a coupling cable coupled to the display and including an overlapping portion that overlaps with the power supply cable which extends to the side of the second surface from the side of the first surface via the notch as viewed in a thicknesswise direction of the circuit board and is provided on the side of the first surface; and
a projection disposed between the power supply cable and the overlapping portion and projecting from the sidewall of the circuit board in such a manner that the projection forms a first inner surface of the notch and the power supply cable extends from the power supply connector provided on a side of a second inner surface of the notch opposite to the first inner surface to the second surface on a side of the first inner surface via the notch and extends beyond the projection along the sidewall of the circuit board,
wherein the power supply cable, after going through the notch, extends over the overlapping portion while being in contact with a surface of the projection on the side of the second surface, continues to extend over the second surface without returning to the side of the first surface and is coupled to an external power supply connector on the side of the second surface.

9. The notebook type personal computer according to claim 8, wherein a ground portion is provided on the projection.

10. The notebook type personal computer according to claim 8, wherein the circuit board is disposed such that the thicknesswise direction of the circuit board is a vertical direction; and the projection projects in a horizontal direction from the circuit board.

11. The notebook type personal computer according to claim 10, wherein the power supply cable passes an upper side in the vertical direction with respect to the projection; and the overlapping portion is disposed on a lower side in the vertical direction with respect to the projection.

12. The notebook type personal computer according to claim 11, wherein the power supply cable is supported by own weight of the power supply cable on the projection.

13. The notebook type personal computer according to claim 11, wherein the overlapping portion is spaced by own weight of the overlapping portion to the lower side in the vertical direction with respect to the projection.

14. The notebook type personal computer according to claim 8, wherein a coupling connector are mounted on the first surface of the circuit board; and the coupling cable is coupled to the coupling connector.

\* \* \* \* \*